(12) United States Patent
Kritt et al.

(10) Patent No.: US 9,671,956 B2
(45) Date of Patent: Jun. 6, 2017

(54) PRESENTING SEARCH TERM SUGGESTIONS ON GRAPHICAL USER INTERFACES

(71) Applicant: LENOVO Enterprise Solutions (Singapore) PTE, LTD., New Tech Park (SG)

(72) Inventors: Barry A. Kritt, Atlantic Beach, NC (US); Sarbajit K. Rakshit, Kolkata (IN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 345 days.

(21) Appl. No.: 14/307,966

(22) Filed: Jun. 18, 2014

(65) Prior Publication Data
US 2015/0370434 A1    Dec. 24, 2015

(51) Int. Cl.
*G06F 3/0488* (2013.01)
*G06F 17/30* (2006.01)

(52) U.S. Cl.
CPC ...... *G06F 3/04886* (2013.01); *G06F 17/3064* (2013.01)

(58) Field of Classification Search
CPC .............................. G06F 3/0484; G06F 3/0481
See application file for complete search history.

(56) References Cited

U.S. PATENT DOCUMENTS

| 8,484,573 | B1 | 7/2013 | Zhai et al. | |
|---|---|---|---|---|
| 8,490,008 | B2 | 7/2013 | Griffin et al. | |
| 8,631,004 | B2* | 1/2014 | Mishne | G06F 17/30864 707/727 |
| 2011/0099506 | A1* | 4/2011 | Gargi | G06F 3/0234 715/773 |
| 2012/0084310 | A1 | 4/2012 | Lieb | |
| 2013/0091411 | A1 | 4/2013 | Rampson et al. | |
| 2013/0120267 | A1* | 5/2013 | Pasquero | G06F 17/276 345/168 |
| 2013/0176228 | A1* | 7/2013 | Griffin | G06F 17/276 345/168 |
| 2013/0285913 | A1 | 10/2013 | Griffin et al. | |
| 2014/0002363 | A1 | 1/2014 | Griffin et al. | |
| 2014/0104177 | A1* | 4/2014 | Ouyang | G06F 3/04883 345/168 |

(Continued)

FOREIGN PATENT DOCUMENTS

KR        20100043009 A        4/2010

*Primary Examiner* — David Choi
(74) *Attorney, Agent, or Firm* — Kunzler Law Group (57) ABSTRACT

A method, system, and computer program product for presenting search term suggestions on a graphical user interface (GUI) are provided in the illustrative embodiments. A first keyword is extracted from a first suggested search term, the first suggested search term being a member of a subset of a set of suggested search terms. On the GUI a first graphical artifact is identified, wherein the first graphical artifact relates to the first keyword. The first graphical artifact is modified such that a modified first graphical artifact presents a default function of the first graphical artifact, and a first function of the modified first graphical artifact on the GUI. The modified first graphical artifact is presented on the GUI to receive one of a default input and a first input.

15 Claims, 7 Drawing Sheets

(56) References Cited

U.S. PATENT DOCUMENTS

| | | | |
|---|---|---|---|
| 2014/0317547 A1* | 10/2014 | Bi | G06F 3/0482 715/773 |
| 2015/0317365 A1* | 11/2015 | Andress | G06F 17/2247 707/722 |
| 2015/0370434 A1* | 12/2015 | Kritt | G06F 17/3064 715/809 |

* cited by examiner

FIG. 6

PRESENTING SEARCH TERM SUGGESTIONS ON GRAPHICAL USER INTERFACES

TECHNICAL FIELD

The present invention relates generally to a method, system, and computer program product for performing searches from a graphical user interface (GUI). More particularly, the present invention relates to a method, system, and computer program product for presenting search term suggestions on graphical user interfaces.

BACKGROUND

Many modern devices allow a user to touch a screen as a way of providing a user-input. A touch-based input or a touch-based gesture is a manner of providing a user input by touching a touch-sensitive device. Any device capable of accepting a touch-based input is referred to herein as a touch-based device. A computer monitor, a smartphone display screen, and a screen of a tablet computing device are all examples touch-based devices employing touch-sensitive screens.

A touch-sensitive screen allows a user to touch the screen at different locations, in different manners, or a combination thereof, to provide touch-based inputs. Generally, the touch-sensitive screen displays a GUI, which includes a set of graphical artifacts, with which the user can interact. The user provides a touch-based input by interacting with or using such an artifact.

A search engine is a software tool that presents a search interface on a user's device, and allows the user to specify a search term to search for content on a network. For example, many search engines, such as Google, Yahoo, and Bing are presently available for use on a variety of devices. (Google is a trademark of Google Inc. in the United States and other countries. Yahoo is a trademark of Yahoo Inc. in the United States and other countries. Bing is a trademark of Microsoft Corporation in the United States and other countries).

These and other search engines typically present a text box and a button on a GUI of a device, such as in a browser window. The user inputs a text string in the text box and provides an input at the button to perform a search for content related to the text string. The text string serves as the search term for the search engine.

When the user has partially input the search term, some search engines provide one or more suggestions to complete the search term in the text box. Such a suggestion is interchangeably referred to herein as "suggestion", "suggested search term", or "search term suggestion" or their respective plural forms.

The user can continue inputting the search term or select one of the suggested search terms. If the user selects one of the suggested search terms, the selected suggestion is loaded into the text box of the search engine interface, the button is regarded as activated, and the search for content related to the selected suggestion begins. Results of the search are later presented to the user on the GUI.

An application executing on the touch-based device accepts the inputs to perform certain operations. Often, the application presents a graphical display on the touch-sensitive screen to guide the user in performing the touch-based gesture.

One or more applications executing on the device may present one or more graphical artifacts on the GUI. For example, on touch-based devices, an application presents a virtual keyboard for the user to type text into a text input field, such as the text box of the search engine interface. The application simulates the keys found on a physical keyboard of a computer via graphical artifacts representing the shape, outline, and markings of the keys on the GUI. Each simulated key is a graphical artifact and has associated therewith an operation when the user interacts with the artifact.

For example, when the user clicks, taps, or touches the simulated key on the virtual keyboard, the application accepts the touch as a user-input, determines the location and/or the manner of the touch, correlates the location with a location of one of the button graphics, and performs the action corresponding to that button graphic which matches the location of the touch. If, for example, the user touches the letter key "A", the application performs an action of entering the letter "A" in the text box relative to which the virtual keyboard is presented.

SUMMARY

The illustrative embodiments provide a method, system, and computer program product for disambiguation of touch-based gestures. An embodiment includes a method for presenting search term suggestions on a graphical user interface (GUI). The embodiment extracts, using a processor and a memory, a first keyword from a first suggested search term, the first suggested search term being a member of a subset of a set of suggested search terms. The embodiment identifies on the GUI a first graphical artifact, wherein the first graphical artifact relates to the first keyword. The embodiment modifies the first graphical artifact such that a modified first graphical artifact presents a default function of the first graphical artifact, and a first function of the modified first graphical artifact on the GUI. The embodiment presents the modified first graphical artifact on the GUI to receive one of a default input and a first input.

Another embodiment includes a computer usable program product comprising a computer readable storage device including computer usable code for presenting search term suggestions on a graphical user interface (GUI). The embodiment further includes computer usable code for extracting, using a processor and a memory, a first keyword from a first suggested search term, the first suggested search term being a member of a subset of a set of suggested search terms. The embodiment further includes computer usable code for identifying on the GUI a first graphical artifact, wherein the first graphical artifact relates to the first keyword. The embodiment further includes computer usable code for modifying the first graphical artifact such that a modified first graphical artifact presents a default function of the first graphical artifact, and a first function of the modified first graphical artifact on the GUI. The embodiment further includes computer usable code for presenting the modified first graphical artifact on the GUI to receive one of a default input and a first input.

Another embodiment includes a data processing system for presenting search term suggestions on a graphical user interface (GUI). The embodiment further includes a storage device including a storage medium, wherein the storage device stores computer usable program code. The embodiment further includes a processor, wherein the processor executes the computer usable program code. The embodiment further includes computer usable code for extracting, using a processor and a memory, a first keyword from a first suggested search term, the first suggested search term being a member of a subset of a set of suggested search terms. The embodiment further includes computer usable code for identifying on the GUI a first graphical artifact, wherein the first graphical artifact relates to the first keyword. The embodiment further includes computer usable code for modifying the first graphical artifact such that a modified first graphical artifact presents a default function of the first graphical artifact, and a first function of the modified first graphical artifact on the GUI. The embodiment further includes computer usable code for presenting the modified first graphical artifact on the GUI to receive one of a default input and a first input.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that touch-based devices often have limited area available to display the information on their touch-based screens. The scarcity of display area arises from the small screen sizes for portability, congestion of graphical artifacts to enable a majority of user interactions via touch interface, or both.

For example, the illustrative embodiments recognize that when a user performs a search, a small portion of the touch-based screen is occupied by the text box and the button of the search interface but a substantially larger portion of the screen is occupied by the virtual keyboard that is needed for touch-based text input into the text box. The illustrative embodiments recognize that as a result, a relatively small portion of the touch-based screen remains available for displaying the search term suggestions.

In some cases, such as in the case of smartphone screens, the virtual keyboard artifacts occupy almost half of the screen area if not more. The illustrative embodiments recognize that a user has to often exit out of the virtual keyboard to free up more screen area for displaying the search term suggestions. The user has to then find the suggested search term that is useful to the user, sometimes by scrolling through a list of mixed suggested search terms that still does not fit the available screen area.

Thus, the illustrative embodiments recognize that presenting and using search term suggestions on a GUI of a touch-based device is particularly cumbersome and inefficient. In the presently available methods, the user has to exit from or otherwise sacrifice some functionality of some graphical artifacts to view a useful number of suggestions, and then perform multiple touch-based interactions on the screen to actually use a suggested search term.

The illustrative embodiments used to describe the invention generally address and solve the above-described problems and other problems related to using search term suggestions on touch-based devices. The illustrative embodiments provide a method, system, and computer program product for presenting search term suggestions on graphical user interfaces.

An embodiment receives the set of suggested search terms returned by a search engine. The embodiment extracts one or more keywords from some or all of the suggested search terms. For example, if the search engine returns hundreds of suggestions, one embodiment selects a subset of those suggestions, e.g., the top twenty suggestions from a ranked list of suggestions.

An embodiment can be configured to extract keywords from suggested search terms using any available method without departing the scope of the illustrative embodiments. For example, one embodiment employs a simple method of an exclusion dictionary, whereby words listed in the exclusion dictionary are not considered keywords. When considering a suggested search term, such an embodiment omits those words in the suggestion that are also present in the exclusion dictionary, and selects one or more remaining words in the suggestion as the keyword(s) that are representative of the suggestion.

Another embodiment uses nouns, adjective, verbs, other parts of speech, or a combination thereof, as keywords that are representative of the suggestion. An embodiment uses comparable parts of speech from grammar of other languages to extract keywords from search term suggestions in languages other than English. An embodiment uses a natural language processing (NLP) tool to perform phrase analysis on the suggested search terms in any given language, and extract one or more keywords therefrom.

Once representative keywords for one or more suggested search terms are available, an embodiment determines a manner of representing those suggested search terms by using, reusing, repurposing, or otherwise imparting additional functionality to graphical artifacts already displayed on a GUI. For example, one embodiment identifies the first letter of a keyword of a search term suggestion. The embodiment then associates that search term suggestion with the graphical artifact that represents the same letter on the virtual keyboard GUI on the touch-based screen.

The embodiment similarly associates one or more suggestions with one or more graphical artifacts present on the GUI. Zero, one, or more than one suggestion can be associated with a single graphical artifact within the scope of the illustrative embodiments.

When an embodiment associates a suggestion with a graphical artifact, the embodiment also associates an additional function or action with the graphical artifact. For example, assume that a user begins to enter a search term "lost civilization" and the search engine returns a suggested search term "lost civilization of Atlantis". An embodiment extracts "Atlantis" as a key word representative of the suggestion. The embodiment associates the suggestion "lost civilization of Atlantis" with the graphical artifact for letter "A" on the virtual keyboard on the GUI.

Normally, when the user interacts with the graphical artifact of letter "A", an action of entering the letter "A" in a text field is performed. The embodiment further associates an additional action with the graphical artifact of letter "A". For example, when the user touches the graphical artifact for letter "A" for longer than a preset duration, a second action is triggered where by the suggested search term "lost civilization of Atlantis" is entered into the text box of the search interface and a search with that search term is initiated.

The duration-based interaction to trigger additional actions associated with the graphical artifact is only described as an example and without implying any limitation thereto. From this disclosure, many other ways of adding additional interactions with a graphical artifact will become apparent to those of ordinary skill in the art and the same are contemplated within the scope of the illustrative embodiments. For example, when the graphical artifact is a key image on a virtual keyboard, and does not have a ALT+Touch, SHIFT+Touch, or CTRL+Touch functionality in the normal interactions with the artifact, an embodiment can add these and other multi-touch interactions and corresponding functionality to such artifacts for a similar purpose.

As another example, whether the graphical artifact is a key image on a virtual keyboard, or something else, an embodiment can add an additional function to the graphical artifact by allowing the artifact to accept a multi-finger touch gesture where the artifact's normal interaction is a single finger touch gesture. As another example, an embodiment can add an additional function to a graphical artifact by allowing the artifact to accept a single finger swipe gesture where the artifact's normal interaction is a single finger tap gesture.

When several suggested search terms are associated with a graphical artifact, an embodiment allows a user to perceive that association of multiple suggestions. For example, one embodiment accepts a predetermined additional interaction with the artifact, and presents a list of the associated suggestions proximate to the artifact. The embodiment then accepts the same or different additional interaction relative to the list to select one of the several suggestions from the list.

The illustrative embodiments are described with respect to certain devices, screens, touch-based gestures, touch-based inputs, graphical artifacts, normal or additional actions, normal or additional functions, normal or additional operations, search terms, suggested search terms, search engines, manners of providing search terms, manners of listing several suggested search terms, manners of associating a suggested search term with a graphical artifact, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
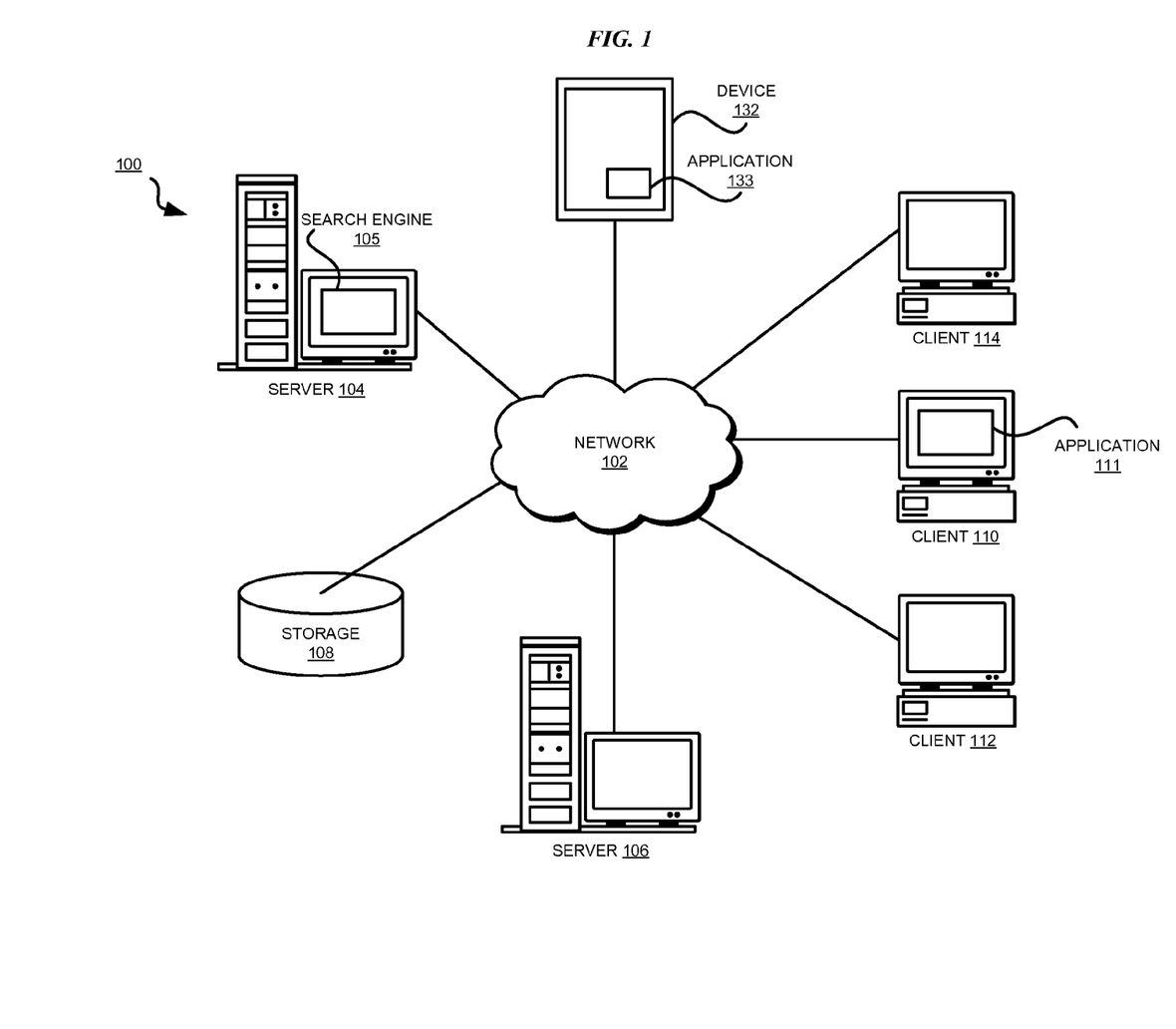
FIG. 1 depicts a block diagram of a network of data processing systems in which illustrative embodiments may be implemented.
Figure 2:
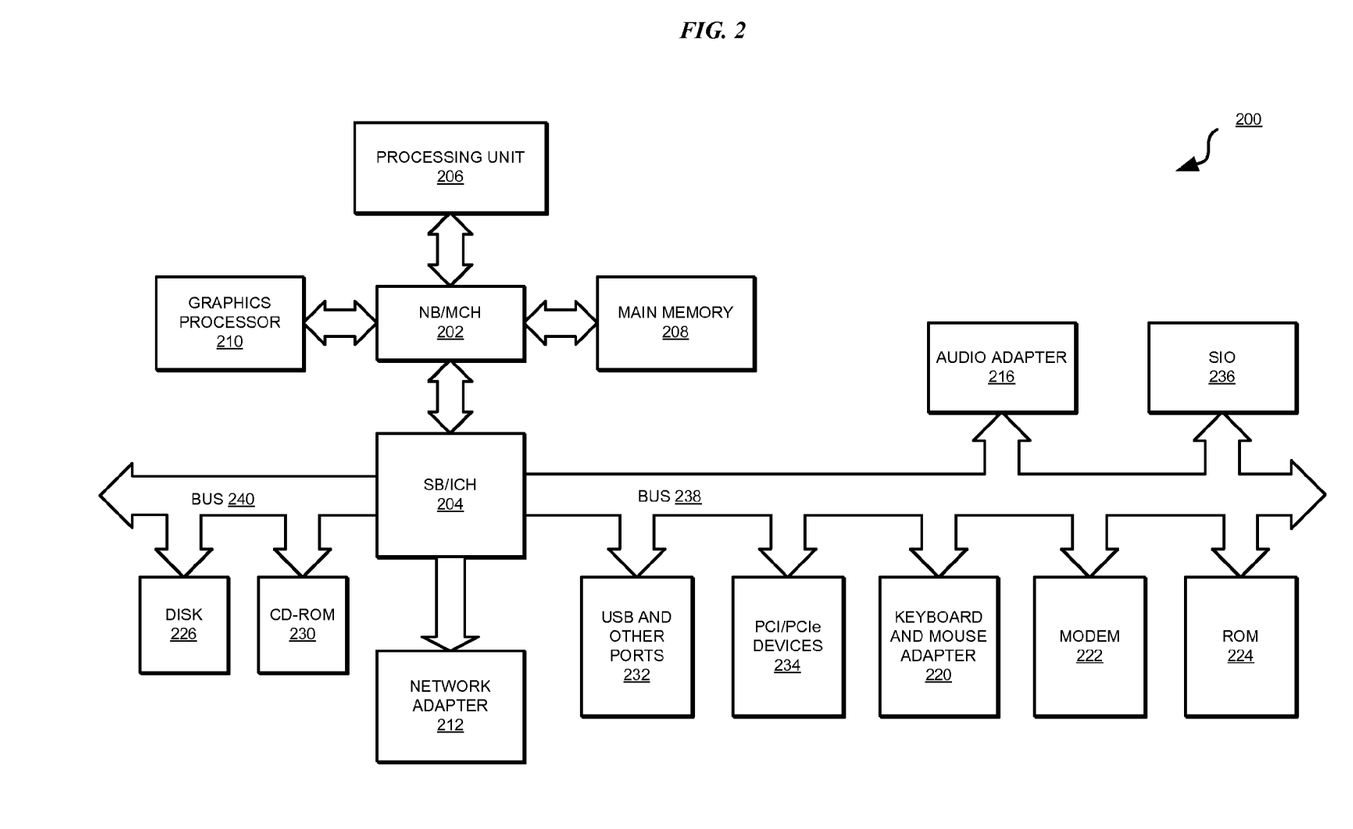
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Search engine 105 in server 104 is one example search engine implementation that provides search term suggestions to a GUI in client 110 or device 132. Application 111 in client 110 implements an embodiment described herein where search term suggestions are associated with graphical artifacts on a GUI on a non touch-based screen or device. Device 132 is a touch-based device, capable of receiving and using touch-based inputs. Application 133 in device 132 implements an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as search engine 105, application 111 or application 133 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
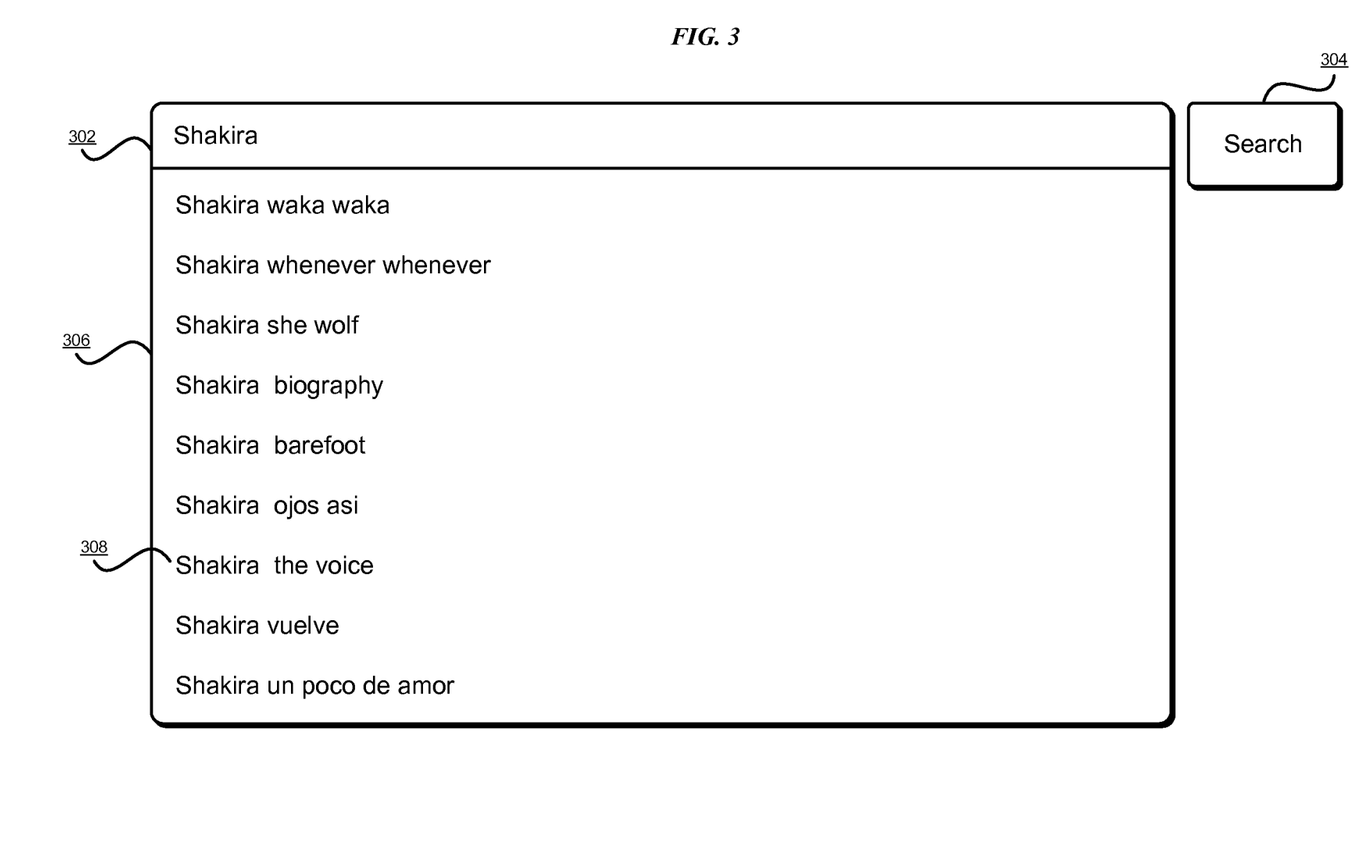
FIG. 3 depicts a block diagram of search term suggestion display, which can be improved by using an illustrative embodiment.

With reference to FIG. 3, this figure depicts a block diagram of search term suggestion display, which can be improved by using an illustrative embodiment. Text box 302 and "search" button 304 are parts of a search interface presented by search engine 105 of FIG. 1, on a GUI in client 110 or device 132 in FIG. 1.

A user begins to input in text box 302 a search term comprising the word "Shakira", such as to search for content related to a particular music performer. Before the user provides an input at button 304, the search engine provides suggestions in list 306.

List 306 includes suggested search terms based on the input the user has provided up to a time prior to providing list 306. As an example, the suggestions in list 306 include the string already input by the user, to wit, "Shakira", and suggestions for types of information that can be found about the performer, such as the titles of various musical recordings the performer has made, a biography about the performer, wiki entries about the performer, and so on.

As the illustrative embodiments recognize, list 306 requires a significant amount of area on the screen to be displayed to the user. Furthermore, as the illustrative embodiments further recognize, list 306 does not organize the suggestions in any particular order that is conducive to manual searching at a glance by the user. When the suggestions are organized in list 306, they are most commonly organized according to popularity of those suggestions in searches performed by other users.

The illustrative embodiments recognize that the popularity of certain suggestions is useful only when the user's search interest is aligned with the other searching users. Often, a user is interested in not something that is popular in other searches but something that is of specific interest to the user. A suggestion that is related to the user's specific interest, if present in list 306, may be anywhere in list 306. Therefore, in many cases, the user has to manually scan the list to find and select that suggestion.

Figure 4:
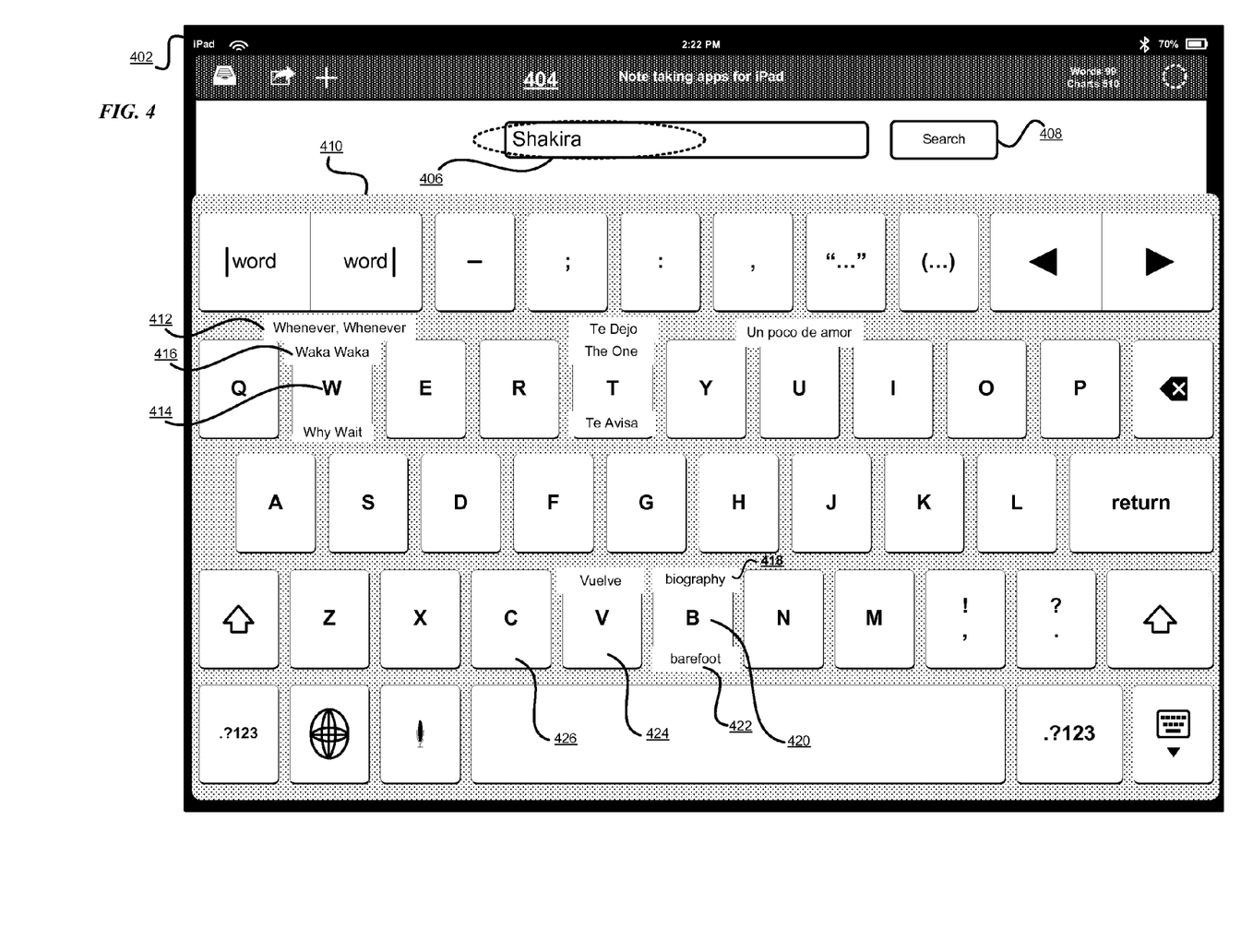
FIG. 4 depicts a block diagram of associating and selecting search term suggestions with graphical artifacts on a GUI in accordance with an illustrative embodiment.

The illustrative embodiments recognize that if the suggestions were organized in a different manner, the user may be able to reach the suggestion of interest more efficiently. For example, assume that the user knows that the information the user is looking for is called "the voice". In list 306, the suggested search term that includes the keyword "voice" appears at the end as suggested search term 308. If however, an embodiment related suggestion 308 with the graphical artifact of letter "V" on the virtual keyboard GUI, the user can intuitively look at the letter key "V" and find associated therewith suggestion 308. FIG. 4 illustrates the example further.

With reference to FIG. 4, this figure depicts a block diagram of associating and selecting search term suggestions with graphical artifacts on a GUI in accordance with an illustrative embodiment. Touch-based screen 402 in a portable computing device, such as a tablet computer, presents GUI 404 to a user. Text box 406 and button 408 are examples of text box 302 and button 304, respectively, in FIG. 3. Virtual keyboard 410 is presented in GUI 404 on touch-based screen 402 by an application executing in the device associated with touch-based screen 402.

An embodiment, such as an embodiment implemented in application 111 or 133 in FIG. 1, receives a set of suggested search terms, such as in list 306 in FIG. 3. The application extracts one or more key words from all or a subset of suggestions in the set. For example, as to the suggestion "Shakira waka waka" the application extracts keywords "waka waka". Similarly, from the suggestion "Shakira whenever whenever" the application extracts keyword "whenever" or keywords "whenever whenever". From the suggestion "Shakira biography" the application extracts keyword "biography", from the suggestion "Shakira barefoot" the application extracts keyword "barefoot", and so on.

The application associates the suggested search term corresponding to a keyword or keywords with a suitable graphical artifact on GUI 404. For example, the application uses a suitable rule or logic to find relationships between keywords and displayed graphical artifacts.

In one example of such rule, the application identifies a beginning letter of a keyword and finds a matching letter key artifact in virtual keyboard 410. Accordingly, the application relates keywords "whenever whenever" (412) with letter key "W" (414) on virtual keyboard 410. The application thus associates the suggested search term "Shakira whenever whenever" from list 306 with letter key "W" (414).

Operating in a similar manner, the application relates the various keywords corresponding to the various suggestions with other graphical artifacts, and associates those corresponding suggestions with such graphical artifacts. For example, the application relates keywords "waka waka" (416) with letter key "W" (414), and associates the corresponding suggested search term "Shakira waka waka" from list 306 with letter key "W" (414). Similarly, the application relates keywords "biography" (418) with letter key "B" (420), and associates the corresponding suggested search term "Shakira biography" from list 306 with letter key "B" (420). The application relates keywords "barefoot" (422) with letter key "B" (420), and associates the corresponding suggested search term "Shakira barefoot" from list 306 with letter key "B" (420).

The application can relate any number of keywords with any number of graphical artifacts, and associate any number of corresponding suggested search terms with those graphical artifacts as shown. Some graphical artifacts have multiple suggested search terms associated therewith, e.g., graphical artifact 414 corresponding to letter key "W", and graphical artifact 420 corresponding to letter key "B". Some graphical artifacts have only one suggested search term associated therewith, e.g., graphical artifact 424 corresponding to letter key "V". Some graphical artifacts have no suggested search terms associated therewith, e.g., graphical artifact 426 corresponding to letter key "C".

In operation, the user can touch, tap, or provide other touch-based on non-touch-based input at a graphical artifact to select the associated suggested search term, have the selected suggestion entered in text box 406, and have the search action of button 408 performed. In an example operation according to an example embodiment, the user hovers over, lingers at, or touches for a predetermined period graphical artifact 424 to select "Shakira vuelve" search term entered in text box 406, and a search executed for that search term.

In another example operation according to an example embodiment, the user swipes left (or right, up, or down) or touches for a first predetermined period graphical artifact 420 to select the top keyword at graphical artifact, to wit, "biography" 418, thereby causing the application to enter "Shakira biography" search term in text box 406, and a causing the application to send an instruction to the search interface to cause a search for that search term to occur. In another example operation according to an example embodiment, the user touches differently, e.g., swipe right (or left, down, or up) or touches for a second predetermined period graphical artifact 420 to select the bottom keyword at graphical artifact, to wit, "barefoot" 422, thereby causing the application to enter "Shakira barefoot" search term in text box 406, and a causing the application to send an instruction to the search interface to cause a search for that search term to occur.

The example touch-based gestures at certain graphical artifacts, corresponding additional operations associated with those graphical artifacts, manner of presenting the associated suggestions or keywords, are described here only for the clarity of the description and not to imply any limitations on the illustrative embodiments. From this disclosure, those of ordinary skill in the art will be able to conceive many other ways of achieving similar objectives, and the same are contemplated within the scope of the illustrative embodiments.

Figure 5:
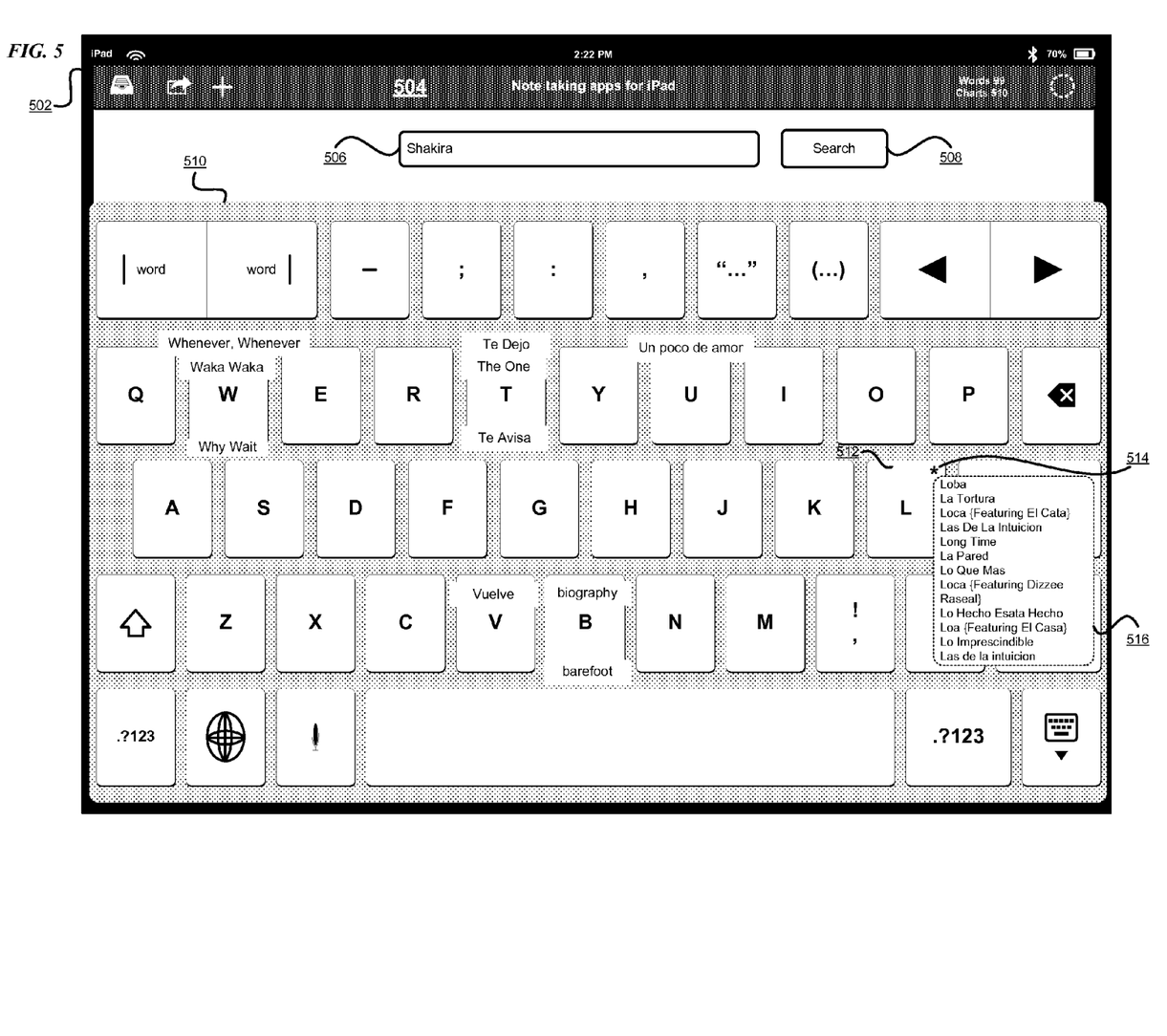
FIG. 5 depicts a block diagram of another example process of associating and selecting search term suggestions with graphical artifacts on a GUI in accordance with an illustrative embodiment.

With reference to FIG. 5, this figure depicts a block diagram of another example process of associating and selecting search term suggestions with graphical artifacts on a GUI in accordance with an illustrative embodiment. Touch-based screen 502 in a portable computing device, such as a tablet computer, presents GUI 504 to a user in a similar manner as screen 402 and GUI 404, respectively, in FIG. 4. Text box 506 and button 508 are examples of text box 406 and button 408, respectively, in FIG. 4. Virtual keyboard 510 is presented in GUI 504 on touch-based screen 502 by an application executing in the device associated with touch-based screen 502, in a manner similar to virtual keyboard 410 in FIG. 4.

An embodiment, such as an embodiment implemented in application 111 or 133 in FIG. 1, can associate multiple suggested search terms with a single graphical artifact, as shown with graphical artifacts 412 and 420 in FIG. 4. In some cases, sufficient space proximate to a graphical artifact may not be available to display or present all the associated keywords and/or corresponding suggestions.

For example, assume that list 306 in FIG. 3 included several suggestions whose keywords started with the letter "L". According to an embodiment, the application associates all such suggestions or their keywords with graphical artifact 512. Instead of crowding a limited area at, around, or near artifact 512 with the keywords, one embodiment causes the application to modify artifact 512 in some way to indicate to the user the presence of associated keywords. As an example, one embodiment causes the application to modify artifact 512 with icon 514.

When the user interacts with icon 514, such as touching, tapping, hovering over, or otherwise performing a touch-based interaction with icon 514, the application presents list 516. List 516 presents to the user a listing of the suggested search terms or their keywords that tall being with the letter "L". The user then selects one of the keywords or suggestions in list 516 by performing a suitable touch-based interaction relative to that keyword or suggestion in list 516.

Note that the modification of artifact 512, the placement or use of icon 514, the manner of presenting list 516, and the manner of interacting with artifact 512 or list 516 are not intended to be limiting on the illustrative embodiments. For example, instead of placing icon 514 on artifact 512, one embodiment makes all or part of artifact 512 act or behave as icon 514 without actually using icon 514. From this disclosure, many other ways of achieving similar objectives will be apparent to those of ordinary skill in the art, and the same are contemplated within the scope of the illustrative embodiments.

Figure 6:
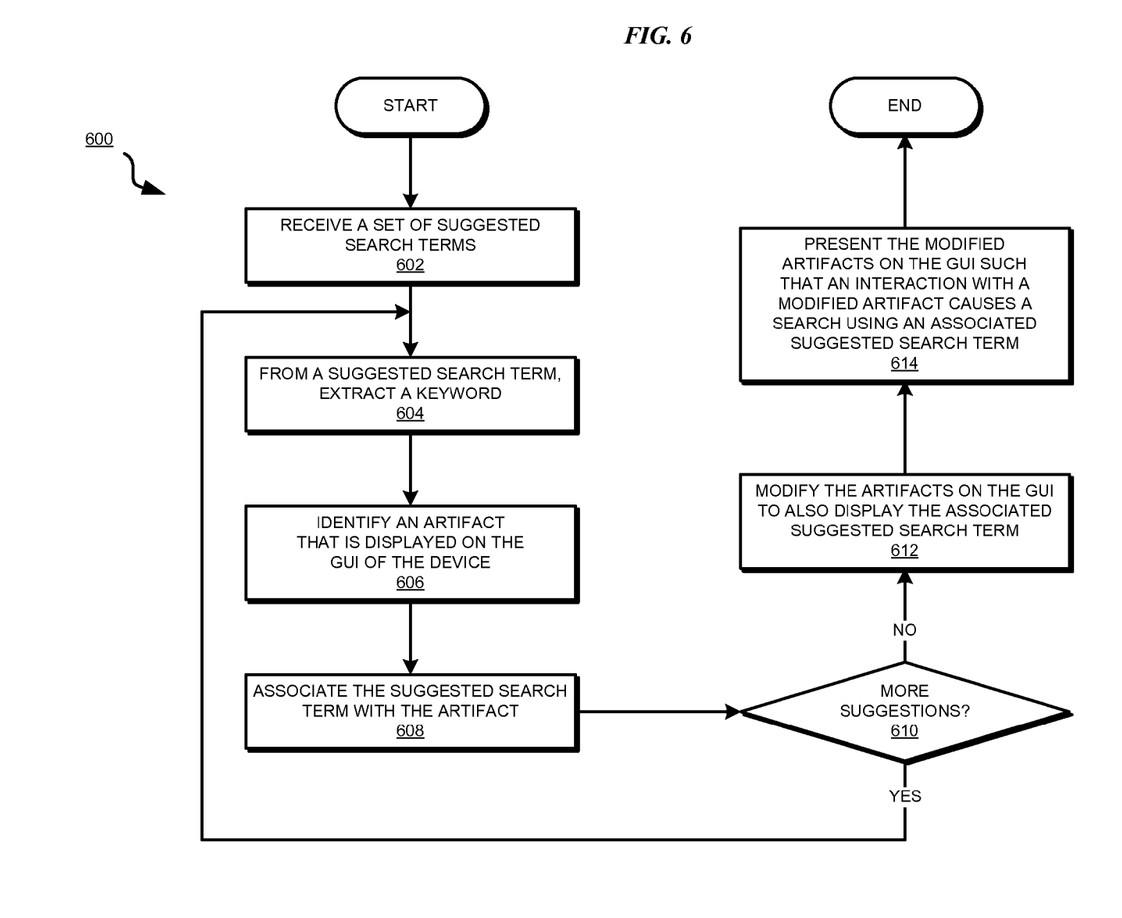
FIG. 6 depicts a flowchart of an example process for associating search term suggestions with graphical artifacts on a GUI in accordance with an illustrative embodiment.

With reference to FIG. 6, this figure depicts a flowchart of an example process for associating search term suggestions with graphical artifacts on a GUI in accordance with an illustrative embodiment. Process 600 can be implemented in application 111 or 133 in FIG. 1.

The application receives a set of suggested search terms, such as list 306 in FIG. 3 (block 602). For example, the set of the suggestions may be in response to the user partially entering a search term in a search interface.

The application selects a suggested search term and extracts one or more keywords from the selected suggested search term (block 604). The application identifies a graphical artifact that is displayed on the GUI of the device where the application is executing and relates to an extracted keyword (block 606). The application associates the selected suggested search term with the identified graphical artifact (block 608).

The application determines whether more suggested search terms have to be processed in a similar manner (block 610). If so ("Yes" path of block 610), the application return s process 600 to block 604 to select another suggested search term and repeat the processing of blocks 604-608 thereon.

If no more suggested search terms remain to be selected or are to be selected ("No" path of block 610), the application modifies the various identified graphical artifacts to also present or display the associated keywords or suggested search terms (block 612). Some example manners of such modifications are depicted in FIGS. 4 and 5, and described in this disclosure without implying a limitation thereto.

The application presents the modified graphical artifacts on the GUI such that an interaction with a modified graphical artifact causes a search using an associated suggested search term (block 614). The application ends process 600 thereafter. Some example manners of such interactions are described with respect to FIGS. 4 and 5 without implying a limitation thereto.

Figure 7:
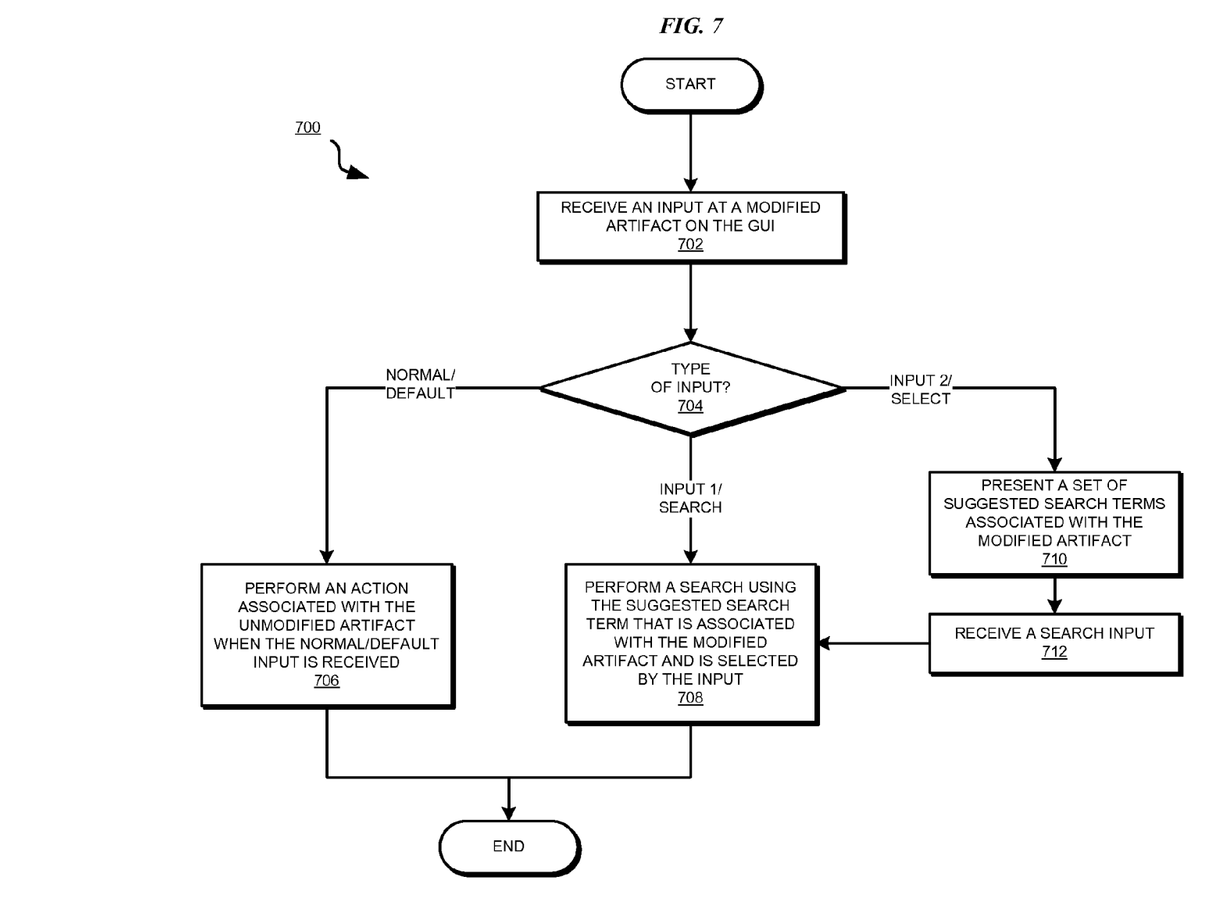
FIG. 7 depicts a flowchart of an example process for presenting search term suggestions on graphical user interfaces in accordance with an illustrative embodiment.

With reference to FIG. 7, this figure depicts a flowchart of an example process for presenting search term suggestions on graphical user interfaces in accordance with an illustrative embodiment. Process 700 can be implemented in application 111 or 133 in FIG. 1.

The application receives an input at a modified graphical artifact on a GUI, such as at a modified graphical artifact presented in block 614 in FIG. 6 (block 702). The application determines a type of the input (block 704).

If the input is a normal or default input that was associated with the unmodified graphical artifact ("Normal/Default" path of block 704), the application performs, or causes to be performed, an action associated with the unmodified graphical artifact (block 706). The application ends process 700 thereafter. For example, when the input is a click or tap on a letter key to cause that letter to be input into a text field, the application causes that letter to be input into the text field.

If the input is of a first type associated with the modified graphical artifact ("Input 1/Search" path of block 704), the application performs or causes to be performed, a search using the suggested search term associated with the modified graphical artifact (block 708). The application ends process 700 thereafter. Some examples of this type of input are described with respect to FIG. 4.

If the input is of a second type associated with the modified graphical artifact ("Input 2/Select" path of block 704), the application presents a set of suggested search terms or their keywords that is associated with the modified graphical artifact (block 710). Some examples of this type of input are described with respect to FIG. 5. The application then receives an input, preferably selecting one of the search terms or keywords from the set (block 712). The input received in block 712 may be same or different from input 1. The application performs or causes to be performed, a search using the suggested search term or keyword selected from the set, in block 708. The application ends process 700 thereafter.

Thus, a computer implemented method, system or apparatus, and computer program product are provided in the illustrative embodiments for presenting search term suggestions on graphical user interfaces.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for presenting search term suggestions on a graphical user interface (GUI), the method comprising:
    extracting, using a processor and a memory, a first keyword from a first suggested search term and a second keyword from a second suggested search term, the first and second suggested search terms being members of a subset of a set of suggested search terms;
    identifying on the GUI a first graphical artifact, wherein the GUI includes a virtual keyboard, the virtual keyboard including graphical artifacts representing letters of an alphabet, wherein the first graphical artifact represents a letter used in the first keyword and the second keyword;
    modifying the first graphical artifact such that a modified first graphical artifact presents a default function of the first graphical artifact, a first function of the modified first graphical artifact, and a second function of the modified first graphical artifact on the GUI; and
    presenting the modified first graphical artifact on the GUI to receive one of a default input comprising a touch-based gesture, a first input comprising a touch based gesture different from the default input, and a second input comprising a touch-based gesture different from the default input and the first input.

2. The method of claim 1, further comprising:
    associating, as a part of the modifying, the first and second keywords with the first graphical artifact to form the modified first graphical artifact; and
    enabling the modified first graphical artifact to receive the first input corresponding to the first function and the second input corresponding to the second function, wherein the first graphical artifact is configured to receive the default input corresponding to the default function prior to the modifying, and wherein the modified first graphical artifact remains configured to receive the default input.

3. The method of claim 2, further comprising:
    receiving, at the modified first graphical artifact, the first input; and
    causing, responsive to the receiving, an entry of the first suggested search term in a search query.

4. The method of claim 2, wherein the first input comprises a touching the modified first graphical artifact for a first predetermined period.

5. The method of claim 2, further comprising:
    receiving, at the modified first graphical artifact, the second input; and
    causing, responsive to the second input, an entry of the second suggested search term in a search query.

6. The method of claim 1, wherein the extracting uses natural language processing.

7. The method of claim 1, wherein the extracting identifies a word corresponding to a specified part of speech in a particular language.

8. The method of claim 1, further comprising:
    receiving the set of suggested search terms responsive to the user inputting a partial search term.

9. A computer usable program product comprising a non-transitory computer readable storage device including computer usable code for presenting search term suggestions on a graphical user interface (GUI), the computer usable code comprising:
    computer usable code for extracting, using a processor and a memory, a first keyword from a first suggested search term and a second keyword from a second suggested search term, the first and second suggested search terms being members of a subset of a set of suggested search terms;
    computer usable code for identifying on the GUI a first graphical artifact, wherein the GUI includes a virtual keyboard, the virtual keyboard including graphical artifacts representing letters of an alphabet, wherein the first graphical artifact represents a letter used in the first keyword and the second keyword;
    computer usable code for modifying the first graphical artifact such that a modified first graphical artifact presents a default function of the first graphical artifact, a first function of the modified first graphical artifact, and a second function of the modified first graphical artifact on the GUI; and
    computer usable code for presenting the modified first graphical artifact on the GUI to receive one of a default input comprising a touch-based gesture, a first input comprising a touch-based gesture different from the default input, and a second input comprising a touch-based gesture different from the default input and the first input.

10. The computer usable program product of claim 9, further comprising:
    computer usable code for associating, as a part of the modifying, the first and second keywords with the first graphical artifact to form the modified first graphical artifact; and
    computer usable code for enabling the modified first graphical artifact to receive the first input corresponding to the first function and the second input corresponding to the second function, wherein the first graphical artifact is configured to receive the default input corresponding to the default function prior to the modifying, and wherein the modified first graphical artifact remains configured to receive the default input.

11. The computer usable program product of claim 10, further comprising:
    computer usable code for receiving, at the modified first graphical artifact, the first input; and
    computer usable code for causing, responsive to the receiving, an entry of the first suggested search term in a search query.

12. The computer usable program product of claim 10, wherein the first input comprises a touching the modified first graphical artifact for a first predetermined period.

13. The computer usable program product of claim 9, wherein the computer usable code is stored in a computer readable storage medium in a data processing system, and wherein the computer usable code is transferred over a network from a remote data processing system.

14. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

15. A data processing system for presenting search term suggestions on a graphical user interface (GUI), the data processing system comprising:

a storage device including a storage medium, wherein the storage device stores computer usable program code; and a processor, wherein the processor executes the computer usable program code, and wherein the computer usable program code comprises:

computer usable code for extracting, using a processor and a memory, a first keyword from a first suggested search term and a second keyword from a second suggested search term, the first and second suggested search terms being members of a subset of a set of suggested search terms;

computer usable code for identifying on the GUI a first graphical artifact, wherein the GUI includes a virtual keyboard, the virtual keyboard including graphical artifacts representing letters of an alphabet, wherein the first graphical artifact represents a letter used in the first keyword and the second keyword;

computer usable code for modifying the first graphical artifact such that a modified first graphical artifact presents a default function of the first graphical artifact, a first function of the modified first graphical artifact, and a second function of the modified first graphical artifact on the GUI; and computer usable code for presenting the modified first graphical artifact on the GUI to receive one of a default input comprising a touch-based gesture, a first input comprising a touch based gesture different from the default input, and a second input comprising a touch-based gesture different from the default input and the first input.

* * * * *